June 5, 1962

B. E. WHEELER 3,037,526

GOVERNOR TRANSFER VALVE

Filed April 11, 1960

FIG_1

FIG_2

INVENTOR.
BYRON E. WHEELER
BY Lothrop & West
ATTORNEYS

June 5, 1962  B. E. WHEELER  3,037,526
GOVERNOR TRANSFER VALVE
Filed April 11, 1960  3 Sheets-Sheet 2
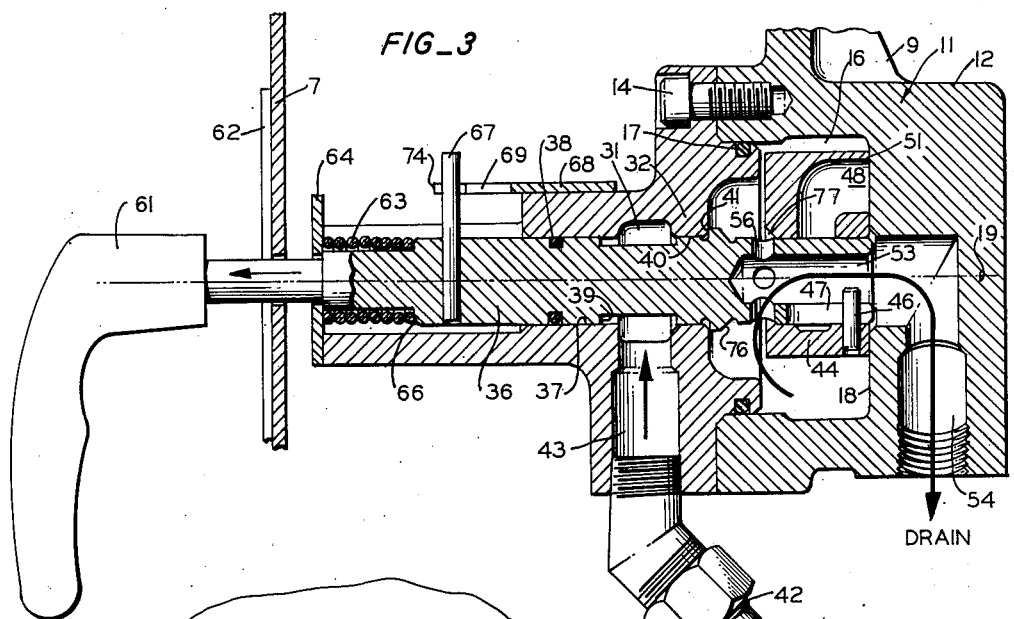
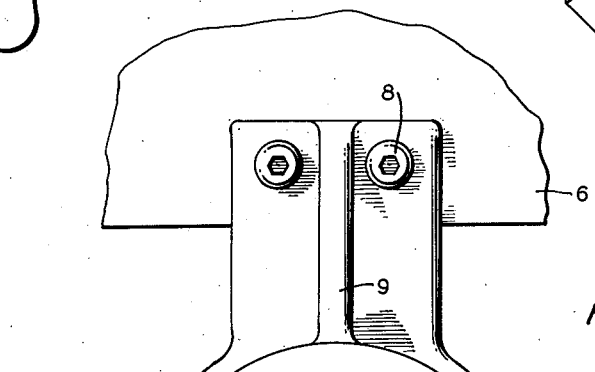
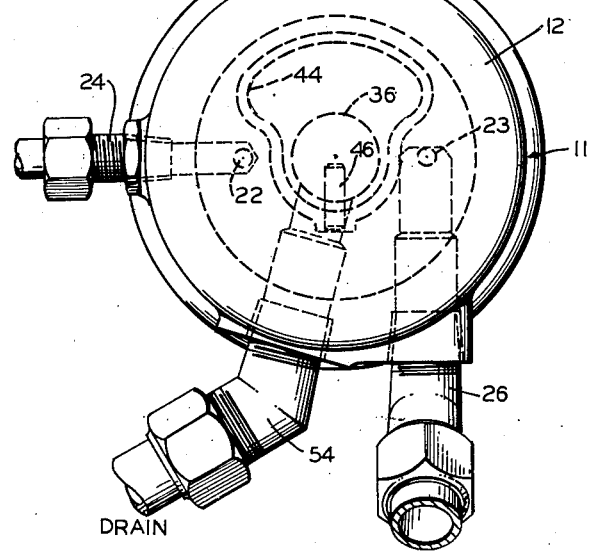
INVENTOR.
BYRON E. WHEELER
BY
*Lothrop & West*
ATTORNEYS June 5, 1962  B. E. WHEELER  3,037,526
GOVERNOR TRANSFER VALVE
Filed April 11, 1960  3 Sheets-Sheet 3
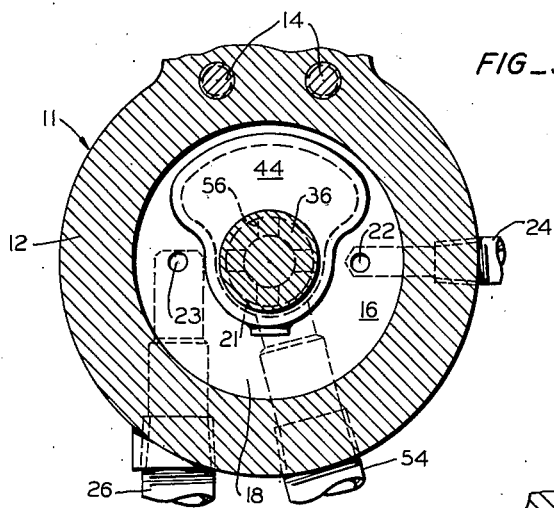
FIG_5
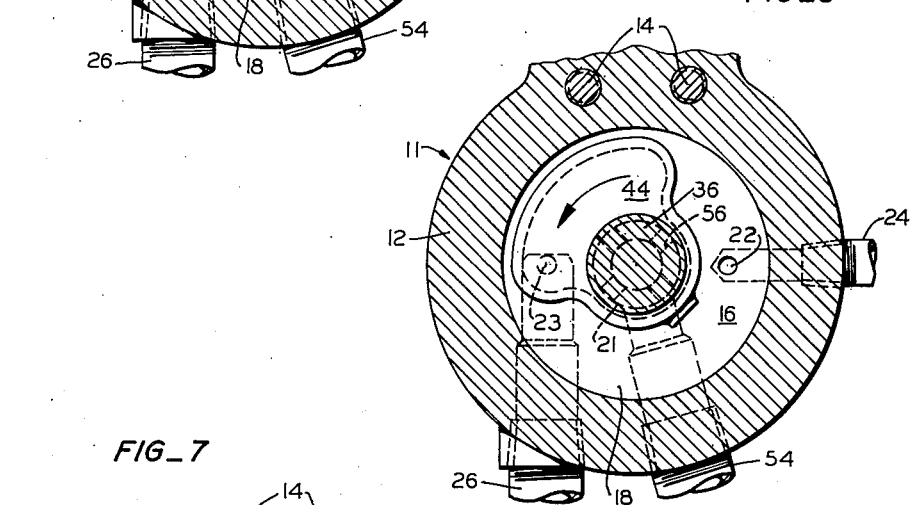
FIG_6
FIG_7
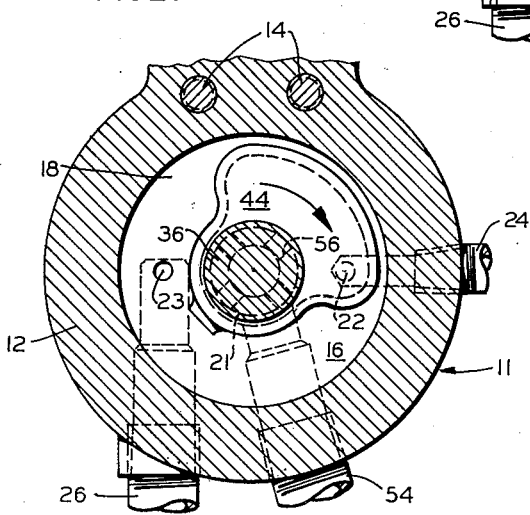
INVENTOR.
BYRON E. WHEELER
BY Lothrop & West
ATTORNEYS United States Patent Office 3,037,526
Patented June 5, 1962

3,037,526
GOVERNOR TRANSFER VALVE
Byron E. Wheeler, Burlingame, Calif., assignor to Baldwin-Lima-Hamilton Corporation, a corporation of Pennsylvania
Filed Apr. 11, 1960, Ser. No. 21,500
5 Claims. (Cl. 137—636.4)

My invention relates to manually operated control valves, particularly hydraulic control valves, and in general to valves especially useful in changing hydraulic connections from one circuit to another despite the fact that the hydraulic pressure may be high. In certain installations, particularly in a governor circuit of the sort shown in Patent 2,707,938 issued May 10, 1955, and assigned to the assignee of the present application, it is necessary to change hydraulic connections despite the fact that the fluid pressure is relatively high, and to accomplish the change by manual means utilizing a hydraulic valve which is unbalanced to reduce leakage.

It is therefore an object of my invention to provide a governor transfer valve which can easily be manipulated by hand, despite the fact that the valve normally is unbalanced and is subjected to a high hydraulic pressure.

Another object of the invention is to provide a transfer valve which is subject to little or no leakage in its normal operating position.

Another object of the invention is to provide a governor transfer valve which will remain in any of its set positions without difficulty.

A still further object of the invention is to provide a governor transfer valve which automatically compensates for wear in use.

Another object of the invention is to provide a transfer valve which is a substantial and distinct improvement over valves heretofore used and presently available.

Other objects, together with the foregoing, are attained in the embodiment of the invention described in the accompanying description and illustrated in the accompanying drawings, in which:

FIGURE 1 is a plan of a governor transfer valve constructed in accordance with the invention and mounted in position for use.

FIGURE 2 is a cross section, the plane of which is indicated by the line 2—2 of FIGURE 1.

FIGURE 3 is a cross section similar to FIGURE 2 but showing the valve in a different position.

FIGURE 4 is a rear elevation of the transfer valve.

FIGURES 5, 6 and 7 are cross sections, the plane of which is indicated by the line 5—5 of FIGURE 2 and each showing the valve in a different position of operation.

While the governor transfer valve pursuant to the invention can be incorporated in a number of different ways for use in different environments, it is especially useful in connection with a governor as indicated, and is so described herein. The governor mechanism includes a frame 6 or mounting particularly positioned with respect to a cabinet front plate 7. Secured to the frame 6 by removable fastenings 8 is a bracket 9 extending from a housing 11. Conveniently, the housing is formed in two parts and includes a base 12 and a cover 13 removably secured to the base by fastenings 14.

The base and cover together define within the housing a chamber 16 designed to be subjected to hydraulic pressure and sealed against leakage by a packing ring 17. The chamber 16 is on one side bounded by a first planar surface 18 substantially normal to the central axis 19 of the device. The planar surface 18 is interrupted by a central opening 21 symmetrical with respect to the axis 19 and also by a first port 22 and a second port 23. The port 22 is connected to its own circuit by means of a conduit 24, whereas the second port 23 is connected in its own circuit by another conduit 26.

Within the housing 11, and preferably entirely formed in the cover 13, is an antechamber 31 symmetrical about the axis 19 and in alignment with the chamber 16 and the central opening 21. Between the antechamber 31 and the chamber 16, the housing 11 is constricted to provide a wall 32 defining a passageway 33 interconnecting the antechamber 31 and the chamber 16.

Designed to be mounted in and cooperate with the housing 11 is a valve stem 36. This is an elongated member substantially symmetrical about the axis 19 and provided with a bearing surface 37 for mounting the valve stem in the housing for rotation about the axis 19 and for endwise movement or axial movement with respect to the axis 19. The valve stem 36 is provided with a packing ring 38 to preclude leakage, and between its ends has a reduced portion 39 and an elarged portion 40. In the position of the valve stem shown in FIGURE 2, which is the "in" position considered as to endwise movement, the passageway 33 is subjected only to a minor obstruction by the reduced portion 39. When the valve stem is in its "out" position, as illustrated in FIGURE 3, the passageway 33 contains a major obstruction in that the enlargement 40 is seated therein tightly enough to preclude any major flow. Adjacent the enlargement 40 a shoulder 41 is formed on the valve stem to serve as a stop to limit the valve stem in its "out" position.

Pressure fluid, such as a hydraulic liquid, for the operation of the mechanisms to be controlled by the valve is supplied through a fitting 42 to a connection 43 opening into the antechamber 31.

Mounted on the valve stem within the chamber 16 is a valve segment 44. The segment is connected to the valve stem by a pin 46 so that the valve stem and the segment must necessarily rotate unitarily but the pin 46 is confined in a longitudinal slot 47 so that the valve stem and the valve segment may move in an endwise direction relative to each other. The valve segment is approximately of the shape shown in FIGURES 5, 6 and 7, and includes a compartment 48 within its confines. The compartment extends around the valve stem and opens through a second planar surface 51 capable of abutting the first planar surface 18 with a tight contact. The circumferential extent of the opening 52 in the surface 51 is sufficient to cover either of the ports 22 or 23 in either extreme position of the segment but to lie between such ports when the segment is in a central position.

The valve stem is also provided with a conduit 53 in one end always communicating with the opening 21 joined to a connection 54 to a convenient fluid drain. The end portion of the valve stem also is provided with ports 56 opening into the conduit 53. In one endwise position of the valve stem the ports 56 afford free communication between the compartment 48 and the conduit 53, and in the other endwise position of the valve stem the ports 56 afford communication between the chamber 16 and the conduit 53.

At its outboard end, the valve stem carries an operating handle 61 movable over an indicator plate 62 on the cabinet front 7 and effective to rotate the valve stem and to move it endwise. The valve stem is urged toward its "in" position by a coil spring 63 at one end butting against a washer 64 secured to the housing 11 and at the other end abutting a shoulder 66 formed on the valve stem. A cross pin 67 firmly mounted in the valve stem extends radially to interengage with portions of a positioning plate 68 fixed on the housing 11. The plate 68 has a central notch 69 for receiving the pin 67, and also has a side notch 71 and another side notch 72 for similarly receiving the pin 67. The ends 73 and 74 of the plate 68 are of a sufficient axial extent so as to act as rotary stops for the final limits of valve stem rotation.

The spring 63 does not urge the pin 67 entirely to the bottom of the notches 69, 71 or 72, since the inward stop is achieved by a conical portion 76 of the valve stem effective to seat on a corresponding conical depression 77 in the valve segment. The conical portions 76 and 77 act together as a fluid seal as well as a mechanical stop. The force of the spring is thus imposed on the valve segment to force the second planar surface 51 against the first planar surface 18 and so furnishes some of the unbalanced force on the valve segment.

In the operation of this device, the parts can first be considered as in the central one of the three principal rotational positions and as in the "in" position considered endwise, as illustrated in FIGURE 2. Hydraulic fluid under pressure is supplied through the fitting 42, the ports 22 and 23 are appropriately connected to the mechanisms to be served and the connection 54 is effectuated to drain. The spring 63 urges the valve segment 44 into its sealing position and hydraulic pressure within the antechamber 31 and effective in the passageway 33 and in the chamber 16 also is imposed upon the exposed surface of the valve segment to force it tightly against the housing 11. The opening 52 of the valve segment is not in registry with either of the ports 22 or 23 so that the segment blocks flow to the outlet or drain connection 54. Hydraulic pressure is uniformly exerted on the ports 22 and 23.

When a change is to be made, the operator first moves the handle 61 in an endwise direction to find its "out" location. This is accompanied by movement of the pin 67 in its notch 69 to a sufficient distance to clear the notch. This endwise movement compresses the spring 63 and shifts the enlargement 40 into the passageway 33, as shown in FIGURE 3. High pressure is thus cut off from the chamber 16 and connected parts of the structure. Also, the ports 56 are moved out of communication with the compartment 48 and into communication with the chamber 16. Thus the previously existing high pressure on the outside of the valve segment 44 and within the mechanism connected through the ports 22 and 23 is relieved through the conduit 53 and the drain connection 54. The pressure then existing upon the valve segment is balanced and is substantially zero. Thereupon the valve segment is easy to move.

The operator then twists the handle 61 either to the right or to the left, depending upon requirement. If the handle is turned to the left (FIG. 6), then the compartment 48 is placed in registry with the port 23. The pin 67 is then in registry with the notch 71. When the operator releases the handle 61, the spring 63 translates the valve stem to the "in" position. This causes spring pressure to be exerted through the cone 76 onto the valve segment 44 and initially presses the surfaces 18 and 51 together. Also, the obstruction or enlargement 40 is removed from the passageway 33 and hydraulic flow from the inlet 43 can again take place through the passageway 33 and is again effective within the chamber 16 to urge the valve segment tightly against the surface 18. Pressure is also then available to the port 22 while the port 23 is connected through the compartment 48 and the ports 56 to the drain connection 54.

Comparably, when a shift is to be made to the opposite extreme one of the three rotary positions of the valve, the handle 61 is first pulled outwardly so that the valve stem moves to its "out" position. This again has the effect of blocking the passageway 33 to isolate the high pressure fluid and of connecting the chamber 16 and any port open thereto through the ports 56 to drain, thus relieving the high pressure existing upon the valve segment 44. After the pressure has been sufficiently reduced, the handle 61 can be restored either to its central position or to its opposite extreme position with the pin 67 entering the notch 72 when the handle 61 is released. This movement is again effectuated by the spring 63 which restores the previous conditions, except that the port 22 is now connected to drain (FIG. 7), whereas high pressure fluid is supplied to the port 23. The restored pressure upon the valve segment 44 holds the segment in leakproof relationship pending further motion.

What is claimed is:

1. A governor transfer valve comprising a housing having an interior chamber bounded on one side by a first planar surface; means defining a central opening in said first planar surface and first and second ports in said first planar surface; means forming an ante-chamber in said housing in line with said opening; means defining a passageway in said housing in line with said opening and communicating with said chamber and said ante-chamber; a valve stem mounted in said housing for rotary movement into three positions and for endwise movement into "in" and "out" positions, said valve stem extending through said ante-chamber, through said passageway, and through said chamber into said central opening; means on said valve stem defining a minor obstruction of said passageway when said valve stem is in said "in" position and a major obstruction of said passageway when said valve stem is in said "out" position; means forming a pressure fluid connection to said ante-chamber; a valve segment bounded on one side with a second planar surface abutting said first planar surface; means for mounting said valve segment on said valve stem for rotation unitarily therewith and for endwise movement relative thereto; means forming a compartment in said valve segment around said valve stem and opening in said second planar surface; means forming a conduit in said valve stem open to said central opening and in said "in" position open to said compartment and closed to said chamber and in said "out" position open to said chamber; and means forming a fluid drain connection to said central opening.

2. A governor transfer valve comprising a housing having a chamber, inlet means for conducting fluid to said chamber, outlet means for conducting fluid from said chamber, a valve stem mounted in said housing for endwise movement and for rotary movement, means responsive to said endwise movement of said valve stem for controlling communication between said chamber and said inlet means and said outlet means, means defining ports in said housing opening into said chamber, a valve segment rotatable in said chamber to control flow through said ports, and means for connecting said valve stem and said valve segment for rotation together and for relative endwise movement.

3. A governor transfer valve comprising a housing having a chamber therein bounded on one side by a first planar surface, inlet means for conducting fluid to said chamber, outlet means including an opening in said surface for conducting fluid from said chamber, a valve stem mounted in said housing for endwise movement and for rotary movement, means responsive to endwise movement of said valve stem in said housing for controlling flow from said inlet means into said chamber and from said chamber into said outlet means, a valve segment in said chamber and having a second planar surface abutting said first planar surface, means defining ports in said housing and opening through said first planar surface into said chamber, means mounting said valve segment for rotation with said valve segment covering said opening and selectively covering said ports, and means responsive to rotary movement of said valve stem in said housing for correspondingly rotating said valve segment.

4. A governor transfer valve comprising a housing having a chamber therein bounded by a first planar surface, inlet means for conducting fluid into said chamber, means defining an opening in said first planar surface, outlet means including said opening for conducting fluid from said chamber, means defining a port in said first planar surface, a valve segment in said chamber and having a second planar surface abutting said first planar surface, means defining a compartment in said valve segment opening through said second planar surface, a valve stem mounted in said housing for endwise and rotary movement and extending through said valve segment and said compartment into said opening, means forming a conduit in said valve stem opening into said compartment and into said outlet means, means for connecting said valve stem and said valve segment for rotation together to move said compartment into and out of alignment with said port, and means effective by endwise movement of said valve stem relative to said valve segment for controlling flow from said inlet means into said chamber and from said compartment into said outlet means.

5. A governor transfer valve comprising a housing having a chamber therein bounded by a first planar surface and having an ante-chamber separated from said chamber by a wall having a passageway therethrough, inlet means for conducting fluid into said ante-chamber, means defining an opening in said first planar surface in line with said passageway, outlet means including said opening for conducting fluid from said chamber, means defining a port in said first planar surface, a valve segment in said chamber and having a second planar surface abutting said first planar surface, means defining a compartment extending through said valve segment and also opening through said second planar surface, a valve stem mounted in said housing for endwise and rotary movement and extending through said ante-chamber and said passageway and said chamber and said compartment into said opening, means forming a conduit in said valve stem opening into said compartment and into said outlet means, means on said valve stem for blocking said passageway, means for moving said valve stem endwise in said housing for shifting said blocking means into said passageway and for shifting said conduit forming means out of said compartment, and means unaffected by endwise movement of said valve stem in said housing for rotating said valve segment to move said compartment into and out of alignment with said port.

References Cited in the file of this patent
UNITED STATES PATENTS 2,818,878    Russell _____ Jan. 7, 1958

FOREIGN PATENTS 16,854    Great Britain _____ 1910